United States Patent Office 2,768,195
Patented Oct. 23, 1956

2,768,195

DI-α-SUBSTITUTED AMINONITRILES AND PROCESSES FOR THE MANUFACTURE THEREOF

Raymond M. Dodson, Park Ridge, Ill., assignor, by mesne assignments, to G. D. Searle & Co., Skokie, Ill., a corporation of Delaware No Drawing. Application February 4, 1954,
Serial No. 408,313

21 Claims. (Cl. 260—465)

This invention relates to derivatives of aminoalkyl-α-phenyl-α-sulfonylnitriles and to processes for the preparation thereof. In particular, this invention relates to compounds of the formula

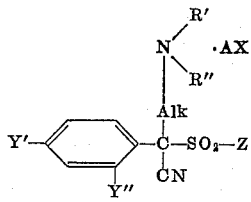

wherein R', R", and A are hydrogen or lower alkyl radicals containing not more than 5 carbon atoms, X is one equivalent of a non-toxic anion, Alk is a lower alkylene radical containing not more than 4 carbon atoms, Z is a monovalent hydrocarbon radical containing not more than 7 carbon atoms, and Y' and Y" are hydrogen or halogen.

In the foregoing structural formula, the radicals R', R", and A each represent either hydrogen or a lower alkyl radical such as a methyl, ethyl, propyl, isopropyl, butyl, isobutyl, secondary butyl, amyl, secondary normal amyl, or tertiary amyl radical. Alk represents a lower alkylene radical as remarked, said alkylene radical being defined as a bivalent, saturated, acyclic, straight- or branched-chain hydrocarbon radical of empirical formula $$C_nH_{2n}$$

wherein $n$ is a positive integer amounting to at least one and not more than 4. The alkylene radicals comprehended by Alk as hereinabove defined include, for example, (—CH$_2$—)
Methylene (—CH$_2$CH$_2$—)
1,2-ethylene

1,1-dimethyl-1,2-ethylene (—CH$_2$CHCH$_3$—)

1,2-propylene (—CH$_2$CHCH$_2$—)
|
CH$_3$ 2-methyl-1,3-propylene (—CH$_2$CH$_2$CH$_2$—)
Trimethylene (—CH$_2$CH$_2$CH$_2$CH$_2$—)
Tetramethylene and such other lower alkylene radicals as fall within the purview of the aforesaid definition and terms. Z represents a monovalent hydrocarbon radical such as a methyl, ethyl, cyclopentyl, cyclohexyl, phenyl, benzyl, or tolyl radical. Y' and Y" each represent hydrogen or a halogen such as bromine or chlorine. The substituent X represents one equivalent of such anions as chloride, bromide, iodide, methylsulfate, ethylsulfate, benzenesulfonate, toluenesulfonate, tartrate, succinate, malate, acetate, citrate, nitrate, sulfate, phosphate, sulfamate, and the like, which, in combination with the cationic portions of the compounds hereinafter claimed, are non-toxic in pharmaceutical dosage.

The compounds of this invention are useful in medicine as diuretics. They have the property of augmenting both urine volume and sodium excretion, producing a significant loss of body weight and decreased dyspnea in cases of edema associated with congestive cardiac failure, renal disease, cirrhosis of the liver, and other common pathologic states.

Additionally, the subject compounds are of value because of their regulatory effect on the cardiovascular system. In particular, their capacity for the reduction of elevated blood pressures presages widespread application in the control of a variety of blood dyscrasias and related syndromes.

Still further, the compounds of this invention manifest useful anticholinergic properties. They enable the blocking of nerve-impulse transmission across the autonomic ganglia, as well as inhibit such transmission at the neuroeffector junctions of the parasympathetic and cerebral spinal nervous system.

The amine bases which comprise this invention are relatively insoluble in water, but may be dissolved in dilute acids and in most of the common organic solvents. The acid addition and quaternary ammonium salts of this invention are, on the other hand, readily soluble in water or in aqueous solutions of alcohols and other water-miscible organic solvents. The subject compounds may be administered in solid form as tablets or capsules; dissolved in aqueous media, they may be given parenterally.

The α-phenylsulfonyl compounds to which this invention relates are prepared by means of the following procedure: Benzaldehyde or a halobenzaldehyde such as 2,4-dichlorobenzaldehyde is reacted with benzenesulfonyl chloride and an alkali metal cyanide, such as sodium cyanide—preferably at reduced temperatures of the order of 0–5° centigrade using an aqueous medium—to give the corresponding α-cyanobenzyl benzenesulfonate. The benzensulfonate is converted to an α-phenyl-α-phenyl-sulfonylacetonitrile by interaction in a polar solvent—for example, a ketonic solvent such as acetone—with thiourea and an additional quantity of benzenesulfonyl chloride. This, in turn, is reacted with an appropriate aminoalkyl halide—for example, β-diethylaminoethyl chloride—in the presence of a base and, desirably, in aqueous medium, to give the desired aminoalkyl-α-phenyl-α-phenylsulfonylnitrile. Alternatively, the latter reaction may be carried out in alcoholic solution at reflux temperatures.

The α-alkylsulfonyl-, α-cycloalkylsulfonyl-, α-benzysulfonyl-, and α-tolylsulfonylnitriles of this invention may also be obtained by the foregoing procedure, provided alkanesulfonyl chloride, cycloalkanesulfonyl chloride, α-toluenesulfonyl chloride, and o-, m-, or p-toluenesulfonyl chloride, respectively, are substituted for benzenesulfonyl chloride in the reaction with a benzaldehyde and an alkali metal cyanide, and again in the reaction with sulfonate and thiourea. A preferred embodiment of the present invention, however, contemplates the preparation of these compounds simply by replacing, with a sulfonyl chloride of choice, the benzenesulfonyl chloride used in the second step of the synthesis of the α-phenyl-α-phenyl-sulfonylacetonitriles outlined above. In accordance with this procedure, an appropriate α-cyanobenzyl benzenesulfonate is reacted at ordinary temperatures with a selected alkanesulfonyl, cycloalkanesulfonyl, or toluenesulfonyl chloride in the presence of thiourea, using acetone or the equivalent as a solvent, to produce the desired intermediate which, when reacted with an aminoalkyl halide as previously described, yields the corresponding aminoalkyl-α-(alkylsulfonyl, cycloalkylsulfonyl, benzylsulfonyl, or tolylsulfonyl)-α-phenylnitrile of this invention.

Conversion of the tertiary bases obtained by the foregoing procedures to the corresponding acid addition salts of the subject invention is accomplished by simple admixture of the said bases with at least one equivalent of any of various inorganic and strong organic acids, the anionic portion of which conforms to the definition of X as set forth above. Alternatively, the tertiary bases may be quaternized by addition of an alkyl ester of the formula

R—X where R and X have the meanings hereinabove assigned. Quaternization takes place in the temperature range of 0 to 100° centigrade, using an inert solvent such as chloroform, acetone, methyl ethyl ketone, methanol, butanol, or the like. The reaction is ordinarily completed in from 10 to 48 hours and is generally carried out in a closed system if a lower alkyl halide such as methyl chloride is one of the reagents. Using methyl chloride, the reaction may be smoothly effected in chloroform solution at 25° centigrade for 24 hours.

The following examples will illustrate in detail certain of the compounds which constitute the present invention and methods which have been devised for their preparation. However, the invention is not to be construed as limited thereby, either in spirit or in scope since it will be apparent to those skilled in the art of organic synthesis, that many modifications, both of materials and of methods may be practiced without departing from the purpose and intent of this disclosure. In the examples hereinafter detailed, temperatures are given in degrees centigrade (°C.), pressures in millimeters (mm.) of mercury, and relative amounts of materials in parts by weight, except as otherwise noted.

EXAMPLE 1

A. *α-Phenyl-α-phenylsulfonylacetonitrile.* — A mixture of 106 parts of benzaldehyde, 176 parts of benzenesulfonyl chloride, 49 parts of sodium cyanide, and 200 parts of water is maintained with stirring at 0–5° C. for 2½ hours. The precipitate which forms is recovered on a filter, washed thereon with water, and then dissolved in 560 parts of acetone. To this solution, with agitation, is added 176 parts of benzenesulfonyl chloride, followed portion-wise by 152 parts of thiourea. The slurry which forms is cooled at 0–5° C. for one hour, then treated with 400 parts of ethyl alcohol and 500 parts of water. The mixture is heated to 90° C., cooled, and filtered, in that order. The precipitate thus recovered is washed by suspension in water, then isolated by filtration, and finally taken up in dilute aqueous potash. A small amount of insoluble material is filtered out, and the filtrate is thereupon made acid with glacial acetic acid. The product which precipitates, crystallized from dilute aqueous acetone, is α-phenyl-α-phenylsulfonylacetonitrile, M. P. 148–150° C.

B. *γ-Diethylamino - α - phenyl - α - phenylsulfonylbutyronitrile hydrochloride.*—To a solution of 52 parts of α-phenyl-α-phenylsulfonylacetonitrile — prepared as described in the foregoing part A—in 500 parts of water containing 17 parts of potash is added, with agitation, 28 parts of 97% β-diethylaminoethyl chloride. The oily layer which separates is extracted with ether; and the ether solution is, in turn, extracted with dilute muriatic acid. The aqueous solution of amine hydrochloride thus obtained is made basic with dilute aqueous potash, precipitating the amine base as an oil which is taken up in ether. The ether solution is dried over anhydrous sodium sulfate and then treated with one equivalent of an absolute isopropyl alcohol solution of hydrogen chloride. The desired product comes down as an oil which crystallized on addition of a small amount of methyl ethyl ketone. The γ-diethylamino-α-phenyl-α-phenylsulfonylbutyronitrile hydrochloride thus obtained is recovered on a filter and finally crystallized from methyl ethyl ketone. The product shows M. P. 192–194° C.

C. *γ-Diethylamino - α - phenyl - α - phenylsulfonylbutyronitrile methobromide.*—A solution of 3 parts of the hydrochloride of the preceding part B in 100 parts of water is made alkaline with dilute aqueous caustic soda. The oily amine base thus precipitated is taken up in ether, and the solvent thereupon distilled off. The residue is dissolved in approximately 30 parts of methyl ethyl ketone, and a solution of 14 parts of methyl bromide in 15 parts of methyl ethyl ketone is added thereto. The materials are maintained at 60° C. in a sealed vessel overnight, whereupon ether is added and the precipitate which has formed is filtered off. Crystallized from a mixture of methyl ethyl ketone, isopropyl alcohol, and cyclohexane, the product, γ-diethylamino-α-phenyl-α-phenylsulfonylbutyronitrile methobromide, shows M. P. 171–173° C. It has the formula

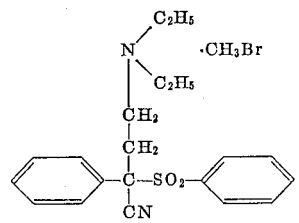

EXAMPLE 2

A. *γ-Dimethylamino - α - phenyl - α - phenylsulfonylvaleronitrile.*—To a solution of 77 parts of α-phenyl-α-phenylsulfonylacetonitrile—obtained by the method of Example 1A above—in 1000 parts of water containing 56 parts of potash is added a solution of 50 parts of β-dimethylaminoisopropyl chloride in 400 parts of water. The materials are maintained with agitation at room temperature for 1 hour, during which time a precipitate forms. The precipitate is filtered off and then washed with water. Crystallized (2 crops) from methyl alcohol, then from a mixture of cyclohexane and benzene, and finally from dilute aqueous methyl alcohol, the material, γ - dimethylamino - α - phenyl - α - phenylsulfonylvaleronitrile, shows M. P. 138.5–139.5° C. The mother liquor from the cyclohexane-benzene crystallization is evaporated to dryness; and the residue thus obtained is crystallized from the dilute aqueous methyl alcohol mother liquor, and then from dilute aqueous ethyl alcohol, to give an additional crop of the foregoing product.

B. *γ-Dimethylamino-β-methyl-α-phenyl-α-phenylsulfonylbutyronitrile.*—The mother liquor from the first (and non-aqueous) methyl alcohol crystallization in the foregoing part A is evaporated to a small volume, water is added, and the mixture is acidified with muriatic acid, in that order. Heated to 90° C., the mixture is freed of insoluble material by filtration. The filtrate is made alkaline with excess ammonium hydroxide, and the resultant precipitate is isolated by decantation of the supernatant aqueous phase. The residue is dissolved in hot petroleum ether. Upon cooling, a substantial amount of material oils out. This is separated from the ethereal supernatant by decantation of the latter and again taken up in hot petroleum ether. On cooling, only a small amount of material oils out. The insoluble material is separated from the ethereal supernatant by decantation and discarded. The two ether solutions are combined and treated with an excess of hydrogen chloride in isopropyl alcohol solution. The crystalline hydrochloride which results is filtered off and crystallized twice from a mixture of methyl ethyl ketone, isopropyl alcohol, and cyclohexane. The mother liquors from these crystallizations are evaporated to a small volume and then diluted with ether, precipitating an additional crop of hydrochloride. The second crop of material is crystallized from a mixture of alcohol and benzene and the purified material thus obtained combined with the crystalline hydrochloride isolated above. The combined product is dissolved in water and the aqueous solution thereupon made alkaline with ammonium hydroxide. The γ-dimethylamino - β-methyl-α-phenyl-α-phenylsulfonylbutyronitrile thus precipitated is filtered out and finally crystallized from dilute aqueous methyl alcohol. The material shows M. P. 87.5–89° C.

C. *γ-Dimethylamino-α-phenyl-α-phenylsulfonylvaleronitrile methobromide.*—To 5 parts of the amine base of part A of this example dissolved in approximaely 50 parts of methyl ethyl ketone is added a solution of 7 parts of methyl bromide in approximately 20 parts of methyl ethyl ketone. The reagents are maintained at 60° C. in a closed vessel overnight, then allowed to cool. The crystalline precipitate obtained in process is recovered on a filter, washed thereon with methyl ethyl ketone, and finally dried in air. Crystallized from a mixture of methyl ethyl ketone, isopropyl alcohol, and cyclohexane, the product shows M. P. 221–223° C. (with decomposition) and has the formula

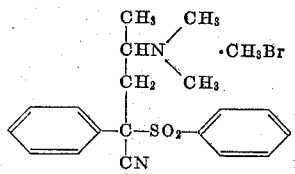

D. *γ-Dimethylamino-β-methyl-α-phenyl-α-phenylsulfonylbutyronitrile methobromide.*—A solution of 5 parts of the amine base of part B of this example in approximately 50 parts of methyl ethyl ketone is treated with a solution of 9 parts of methyl bromide in approximately 25 parts of methyl ethyl ketone. The reagents are kept at 60° C. in a sealed vessel overnight. After cooling, the reaction mixture is filtered. The crystalline precipitate thus isolated is washed with methyl ethyl ketone and then dried in air. Crystallized from a mixture of isopropyl alcohol and cyclohexane, the product, γ-dimethylamino - β-methyl-α-phenyl-α-phenylsulfonylbutyronitrile methobromide, shows M. P. 224–226° C. (with decomposition). It has the formula

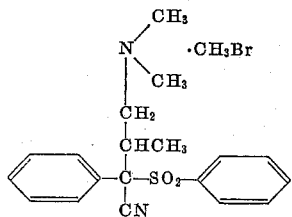

EXAMPLE 3

A. *α-Cyano-p-chlorobenzyl benzenesulfonate.*—A mixture of 70 parts of p-chlorobenzaldehyde, 88 parts of benzenesulfonyl chloride, 25 parts of sodium cyanide, and 100 parts of water is allowed to stand for 3 hours at 0–5° C. with occasional agitation. Cooling is then discontinued and the reaction mixture let stand for 1 hour at room temperature with continued occasional agitation. The aqueous layer is separated and discarded. The oily residue is purified by dissolution in a mixture of acetone, alcohol, and ether, filtration of this solution, and precipitation of the filtrate with 150 parts of ice. The oil which separates is α-cyano-p-chlorobenzyl benzenesulfonate.

B. *α -(p-Chlorophenyl)-α-phenylsulfonylacetonitrile.*—To a solution of 77 parts of the benzenesulfonate of the preceding part A and 18 parts of benzenesulfonyl chloride in 80 parts of acetone is added portionwise over a half-hour period, and with agitation, 15 parts of thiourea. The reaction mixture is then heated at 90° C. for 10 minutes, after which it is diluted with water. The materials are extracted with ether and the ether solution, in turn, extracted first with water and then with dilute aqueous potash. The alkaline extract, upon acidification, precipitates a crystalline solid which, crystallized from dilute aqueous acetone and then from methyl alcohol, shows M. P. 139.5–141° C. This material is α-(p-chlorophenyl)-α-phenylsulfonylacetonitrile.

C. *α -(p-Chlorophenyl)-γ-diethylamino-α-phenylsulfonylbutyronitrile hydrochloride.*—A mixture of 58 parts of the nitrile of the preceding part B dissolved in 500 parts of water containing 17 parts of potash, and 28 parts of 97% β-diethylaminoethyl chloride is maintained with agitation at 90° C. for 20 minutes. The reactants are then cooled and the heavy oil which separates in process is thereupon isolated by decantation of the aqueous supernatant. The oil is washed with water, then dissolved in hot dilute muriatic acid. The acid solution, on cooling, precipitates crystalline α-(p-chlorophenyl)-γ-diethylamino-α-phenylsulfonylbutyronitrile hydrochloride, M. P. 163–165° C.

D. *α-(p - Chlorophenyl)-γ-diethylamino-α-phenylsulfonylbutyronitrile methobromide.*—A solution of 6 parts of the hydrochloride of the preceding part C in 125 parts of water is made alkaline with aqueous caustic soda. The oil which precipitates is extracted into ether and the resultant ether solution dried over anhydrous sodium sulfate and thereupon evaporated to dryness. The residue is taken up in approximately 40 parts of methyl ethyl ketone. To this solution is added approximately 2 parts of methyl bromide dissolved in 40 parts of methyl ethyl ketone. The reactants are kept overnight at 60° C. in a closed container, then cooled and diluted with anhydrous ether. The precipitate which forms is filtered off and crystallized from a mixture of acetone and cyclohexane to give pure α-(p-chlorophenyl)-γ-diethylamino-α-phenylsulfonylbutyronitrile methobromide, M. P. 174–176° C. The product has the formula

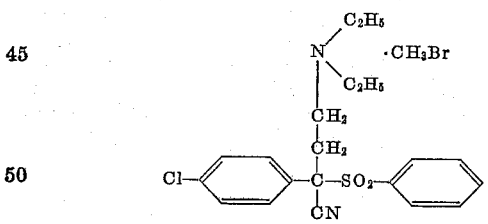

EXAMPLE 4

A. *α - (p-Chlorophenyl)-γ-dimethylamino-α-phenylsulfonylvaleronitrile.*—To a solution of 233 parts of α-(p-chlorophenyl)-α-phenylsulfonylacetonitrile—prepared as described in Example 3B above—in 2000 parts of water containing 112 parts of potash is added 127 parts of β-dimethylaminoisopropyl chloride hydrochloride dissolved in 500 parts of water. The reactants are agitated. The reaction mixture, clear at first, becomes cloudy after a few minutes and a semi-solid oil rapidly settles out. The supernatant aqueous phase is decanted off; and the residual oily solid is thereupon crystallized, first from methyl alcohol, and then from a mixture of cyclohexane and benzene. The pure α-(p-chlorophenyl)-γ-dimethylamino-α-phenylsulfonylvaleronitrile thus obtained shows M. P. 161–162° C.

B. *α-(p-Chlorophenyl)-γ-dimethylamino - β - methyl-α-phenylsulfonylbutyronitrile.*—The mother liquor from the methyl alcohol crystallization in the preceding part A, upon dilution with approximately 3000 parts of water, throws down an oil. The alcohol-water supernatant is decanted off (it may be precipitated with additional water to yield a solid from which unchanged starting material is insoluble), and the residual oil is then taken up in approximately 900 parts of benzene. A small amount of insoluble material is removed by filtration. A solution of 15 parts of hydrogen chloride in approximately 100 parts of absolute isopropyl alcohol is added to the filtrate, following which solvent is evaporated to the point where crystallization begins. Upon cooling, the crystalline precipitate—α - (p-cholorphenyl)-γ-dimethylamino-β-methyl-α-phenylsulfonylbutyronitrile hydrochloride—is recovered on a filter. It shows M. P. 212–217° C. (with decomposition). This material is suspended in water and ammonium hydroxide is thereupon added, q. s. alkalinity. The amine base comes down as an oil which solidifies on standing. Isolated by filtration and then crystallized from dilute aqueous methyl alcohol, it shows M. P. 110–111° C.

C. α-(p-Chlorophenyl)-γ-dimethylamino - α - phenylsulfonylvaleronitrile methobromide.—To a solution of 55 parts of the valeronitrile of part A of this example in approximately 475 parts of methyl ethyl ketone is added a solution of 70 parts of methyl bromide in 240 parts of methyl ethyl ketone. The reagents are maintained overnight at 60° C. in a closed vessel. After cooling, ether is added and the crystalline precipitate of quaternary salt thereupon filtered out. Crystallized from a mixture of methyl ethyl ketone, isopropyl alcohol, and cyclohexane, and then from acetone and cyclohexane, the pure α-(p-chlorophenyl)-γ-dimethylamino-α-phenylsulfonylvaleronitrile methobromide thus obtained shows M. P. 207–209° C. (with decomposition). It has the formula

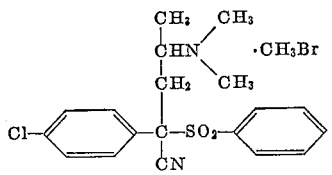

D. α-(p-Chlorophenyl)-γ-dimethylamino - β - methyl-α-phenylsulfonylbutyronitrile methobromide.—To a solution of 20 parts of the butyronitrile of part B of this example in approximately 245 parts of methyl ethyl ketone is added 70 parts of methyl bromide. The reagents are held overnight at 60° C. in a closed system, whereupon the crystalline quaternary salt formed in process is isolated by filtration. Washed with methyl ethyl ketone and then with cyclohexane, the pure α-(p-chlorophenyl)-γ-dimethylamino-β-methyl - α - phenylsulfonylbutyronitrile methobromide thus obtained shows M. P. 211–212° C. (with decomposition). It has the formula

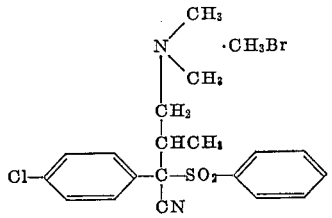

EXAMPLE 5

A. α-Cyano-2,4-dichlorobenzyl benzenesulfonate.—To a mixture of 88 parts of 2,4-dichlorobenzaldehyde and 88 parts of benzenesulfonyl chloride is added a solution of 25 parts of sodium cyanide in 75 parts of water. The reagents are maintained at 0–5° C. for 3 hours, with agitation, whereupon the aqueous supernatant is decanted from the oily residue, and this residue is washed well with water and then crystallized from a mixture of acetone, ethyl alcohol, and ether. Two additional crystallizations using the same solvents as before affords pure α-cyano-2,4-dichlorobenzyl benzenesulfonate, M. P. 47.5–52° C.

B. α-(2,4 - dichlorophenyl) - α - phenylsulfonylacetonitrile.—To a solution of 106 parts of the sulfonate of the preceding part A and 53 parts of benzenesulfonyl chloride in 275 parts of acetone is added, portion-wise with agitation, 45 parts of thiourea. A mildly exothermic reaction ensues. The reactants are cooled to room temperature and maintained thereat with continued agitation for 2½ hours. Approximately 200 parts of ethyl alcohol is then added, followed by sufficient water to dissolve insoluble matter. Clarification is temporary, a dense precipitate being rapidly formed. The mixture is heated at 90° C. for 30 minutes, following which it is cooled and then extracted several times with ether. The ether extracts are combined and extracted in turn with dilute aqueous potash. Upon acidification of the alkaline extract, an oil comes down which granulates on standing. Dissolved in dilute aqueous alkali and reprecipitated with aqueous acid, this material is next crystallized 2 times from a mixture of acetone and ether and, finally, from acetone and water to give pure α-(2,4-dichlorophenyl)-α-phenylsulfonylacetonitrile, M. P. 146–147° C.

C. α-(2,4-dichlorophenyl)-γ-diethylamino-α - phenylsulfonylbutyronitrile hydrochloride.—To a solution of 98 parts of the acetonitrile of the foregoing part B of this example in 1000 parts of water containing 26 parts of potash is added 42 parts of 97% β-diethylaminoethyl chloride. The reagents are thoroughly mixed and then allowed to stand at room temperature overnight. The precipitated oil is extracted into ether and the ether solution thereupon washed with water. The ether solution is next extracted by vigorous agitation with dilute muriatic acid, following which the ethereal phase is decanted off and discarded, leaving a two-phase oil-and-water mixture. This mixture is made alkaline with ammonium hydroxide, whereupon the aqueous phase is decanted off and the oily residue than crystallized from dilute muriatic acid. The desired α-(2,4-dichlorophenyl)-γ-diethylamino-α-phenylsulfonylbutyronitrile hydrochloride thus obtained, after drying for 6 hours at 110° C. over phosphorus pentoxide, shows M. P. 202–205° C. (with decomposition).

D. α-(2,4-dichlorophenyl)-γ-diethylamino-α-phenylsulfonylbutyronitrile methobromide.—A methyl alcohol solution of 3 parts of the hydrochloride described immediately above is treated with an excess of methanolic potash. The materials are poured into water and the resultant mixture thereupon extracted with ether. The ether solution is, consecutively, washed well with water, dried over anhydrous sodium sulfate, and evaporated free of solvent. The residue is taken up in approximately 16 parts of methyl ethyl ketone, and to this solution a solution of approximately 9 parts of methyl bromide in 15 parts of methyl ethyl ketone is added. The materials are maintained in a sealed vessel at 65° C. for 48 hours. Upon addition of a mixture of cyclohexane and acetone, followed by partial evaporation of solvent and prolonged standing, the desired quaternary salt comes down as white crystals, M. P. 162–166° C. The product has the formula

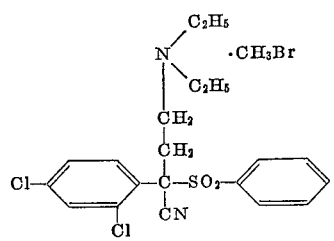

EXAMPLE 6

A. α-Cyanobenzyl benzenesulfonate.—A mixture of 53 parts of benzaldehyde, 88 parts of benzenesulfonyl chloride, 25 parts of sodium cyanide, and 100 parts of water is allowed to stand for 3 hours at 0–5° C. with occasional agitation. The cream-colored solid precipitated in process is filtered out and then dissolved in a cold mixture of 80 parts of acetone, 80 parts of ethyl alcohol, and 35 parts of ether. A small amount of material remains undissolved and is discarded. Addition of 150 parts of ice precipitates α-cyanobenzyl benzenesulfonate as an oil which granulates on standing. Crystallized from ethyl alcohol, it shows M. P. 57.5–58.5° C.

B. α-*Methylsulfonyl-α-phenylacetonitrile*.—To a solution of 55 parts of α-cyanobenzyl benzenesulfonate and 23 parts of methane sulfonyl chloride in 80 parts of acetone is added, portion-wise with agitation over a 25 minute period, 30 parts of thiourea. The mixture is allowed to stand at room temperature for 24 hours. After one hour, a thick cream-colored precipitate is formed in the reaction vessel. The precipitate is separated by filtration and extracted with acetone. Extract and filtrate are combined, whereupon sufficient water is added to cause slight turbidity at the boiling point. Upon cooling and standing, α-methylsulfonyl-α-phenylacetonitrile separates in good yield. Recrystallization from approximately 20 volumes of ethyl alcohol gives the desired product, M. P. approximately 117–117.5° C.

C. γ-*Diethylamino-α-methylsulfonyl-α-phenylbutyronitrile hydrochloride*.—A mixture of 30 parts of the acetonitrile of the preceding part B, 400 parts of ethyl alcohol, 15 parts of potash, and 34 parts of 97% β-diethylaminoethyl chloride is diluted with 250 parts of water, producing a clear solution. The solution is refluxed for 1½ hours and then poured into water. The mixture is extracted with ether, and the ether solution in turn is extracted with dilute muriatic acid. The acid solution is made alkaline with ammonium hydroxide, precipitating an oil which is taken up in ether. The ether solution is treated with one equivalent of an absolute isopropyl alcohol solution of hydrogen chloride. The desired γ-diethylamino-α-methylsulfonyl-α-phenylbutyronitrile hydrochloride so precipitated, upon recrystallization from a mixture of acetone and cyclohexane, shows M. P. approximately 157° C. The product has the formula

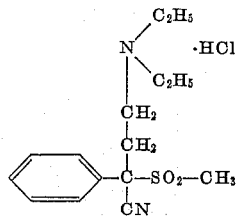

EXAMPLE 7

A. α-*Ethylsulfonyl-α-phenylacetonitrile*.—To a solution of 27 parts of α-cyanobenzyl benzenesulfonate—prepared as detailed in Example 6A—and 13 parts of ethanesulfonyl chloride in 40 parts of acetone is added, portion-wise with agitation over a 30 minute period, 15 parts of thiourea. The mixture is allowed to stand at room temperature for 30 minutes, whereupon 40 parts of alcohol is added, followed by sufficient water to dissolve the precipitate which has formed and bring the solution to the point of cloudiness again. The reactants are allowed to stand overnight, then diluted with water, and finally extracted with ether. The ether solution is washed with water, filtered free of a small amount of insoluble material, and finally extracted with dilute aqueous potash, in that order. The alkaline extract is acidified with muriatic acid, causing precipitation of the product which, recovered on a filter and then crystallized from dilute aqueous methyl alcohol, shows M. P. 79–80° C. The product is α-ethylsulfonyl-α-phenylacetonitrile.

B. γ - *Diethylamino-α-ethylsulfonyl-α-phenylbutyronitrile methobromide*.—To a solution of 42 parts of α-ethylsulfonyl-α-phenylacetonitrile in 500 parts of water containing 17 parts of potash is added 28 parts of 97% β-diethylaminoethyl chloride. The reactants are thoroughly mixed, then, after 20 minutes, extracted with ether. The ether solution, in turn, is extracted with dilute muriatic acid, and the amine base thereupon liberated from this extract by alkalinization thereof with ammonium hydroxide. The oily base is taken up in ether. The ether solution is dried over anhydrous sodium sulfate; and, finally, one equivalent of an absolute isopropyl alcohol solution of hydrogen chloride is added. The hydrochloric acid addition salt precipitates. It is taken up in water and the resultant aqueous solution made alkaline with excess ammonium hydroxide. Extraction of the amine base so precipitated into ether, followed in turn by evaporation of solvent, dissolution of the residue in 20 parts of methyl ethyl ketone, and treatment of this solution at 60° C. for 48 hours in a sealed vessel with 10 parts of methyl bromide in 40 parts of methyl ethyl ketone affords the desired quaternary salt as a product which, crystallized from a mixture of acetone, cyclohexane, and isopropyl alcohol, shows M. P. 156–158° C. The product has the formula

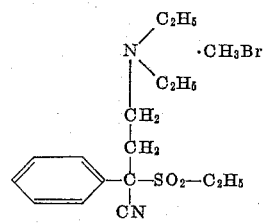

EXAMPLE 8

A. α-*Cyclohexylsulfonyl - α - phenylacetonitrile*.—To a mixture of 39 parts of α-cyanobenzyl benzenesulfonate—prepared as detailed in Example 6A—and 26 parts of cyclohexanesulfonyl chloride—prepared by interaction of cyclohexane and sulfuryl chloride at reflux temperatures in the presence of pyridine—in 55 parts of acetone is added, portion-wise with agitation over a 30 minute period, 27 parts of thiourea. The reagents are allowed to stand for an additional 30 minutes with continued agitation, following which 55 parts of ethyl alcohol, and then sufficient water to dissolve precipitated material and bring the solution again to the point of cloudiness, are added. The reagents are then allowed to stand overnight. Water is added and the resultant mixture is extracted with ether. The ether extract is washed with water, filtered free of a small amount of insoluble material, and extracted with dilute aqueous potash, in that order. A dark brown oil which separates is discarded, as is the ether phase. The alkaline extract is acidified with dilute muriatic acid, precipitating the desired α-cyclohexylsulfonyl-α-phenylacetonitrile, which is separated and used in the succeeding part B of this example.

B. α-*Cyclohexylsulfonyl-γ-diethylamino - α - phenylbutyronitrile hydrochloride*.—A mixture of 26 parts of the α-cyclohexylsulfonyl-α-phenylacetonitrile of the foregoing part A, 9 parts of potash, 20 parts of 97% β-diethylaminoethyl chloride, and 250 parts of ethyl alcohol is combined with 150 parts of water. This mixture is heated at reflux temperature for 1½ hours, whereupon it is poured into approximately 250 parts of water. Extraction into ether, followed in turn by extraction of the ether solution with dilute muriatic acid and subsequent treatment of this acid extract with excess ammonium hydroxide, yields α-cyclohexylsulfonyl-γ-diethylamino - α - phenylbutyronitrile as an oil. The oil is taken up in ether and this solution then dried over anhydrous sodium sulfate. Benzene is added and then evaporated off together with the ether present, to remove residual traces of water azeotropically. The residue is again taken up in ether, and the resultant solution is then treated with one equivalent of an absolute isopropyl alcohol solution of hydrogen chloride. The desired acid addition salt so precipitated, upon repeated recrystallization from isopropyl alcohol, shows M. P. 184–188° C.

C. α-*Cyclohexylsulfonyl - γ - diethylamino-α-phenylbutyronitrile methobromide*.—A solution of 24 parts of the hydrochloride of the preceding part B in water is made alkaline with dilute aqueous potash. The oily amine base so precipitated is extracted into ether. The ether solution, washed well with water, is dried over anhydrous sodium sulfate and then evaporated free of solvent. The residue is taken up in approximately 160 parts of methyl ethyl ketone, and this solution is treated with a solution of 150 parts of methyl bromide in approximately 300 parts of methyl ethyl ketone. The reagents are maintained at 60° C. in a sealed vessel overnight. The materials are then heated to boiling, at which temperature cyclohexane is slowly added to the point whereat crystallization begins. Upon cooling, the desired quaternary salt comes down in good yield. It shows M. P. 182–183° C. and has the formula

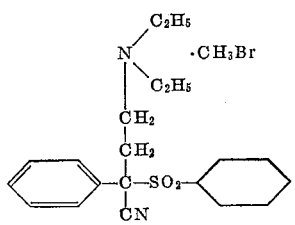

EXAMPLE 9

A. *α-Benzylsulfonyl-α-phenylacetonitrile.*—To a solution of 27 parts of α-cyanobenzyl benzenesulfonate—prepared as detailed in Example 6A above—and 27 parts of α-toluenesulfonyl chloride in 50 parts of acetone is added, portion-wise over a 30 minute period with agitation, 15 parts of thiourea. Agitation is continued for a further 2 hour period, following which the cream-colored solid which precipitates in process is removed by filtration. The precipitate is extracted with 100 parts of acetone, and this acetone extract is combined with the acetone filtrate above. The combined acetone solutions are then concentrated to one-half their original volume. Sufficient water is next added to the boiling concentrate to cause slight turbidity. Upon cooling, a light-yellow-colored solid is precipitated, which, washed by trituration with alcohol and then recrystallized from benzene, shows M. P. 166–166.5° C. The product is α-benzylsulfonyl-α-phenylacetonitrile.

B. *α-Benzylsulfonyl-γ-diethylamino-α-phenylbutyronitrile hydrochloride.*—A solution of 100 parts of the acetonitrile of the preceding part A of this example, 900 parts of ethyl alcohol, 33 parts of potash, 70 parts of 97% β-diethylaminoethyl chloride, and 580 parts of water is heated at reflux temperatures with agitation for 1½ hours. The mixture is then cooled, poured into 5000 parts of water, and extracted with ether, in that order. The ether solution is extracted with dilute muriatic acid, and the amine base then liberated from this aqueous extract by alkalinization with ammonium hydroxide. The base is taken up in ether and the ether solution dried over anhydrous sodium sulfate. Benzene is added and solvent then stripped, the residual water being removed azeotropically in process. The residue is taken up in anhydrous ether and the hydrochloride precipitated therefrom by treatment with one equivalent of an absolute isopropyl alcohol solution of hydrogen chloride. The product, recovered on a filter and washed thereon with acetone, shows M. P. 203–204° C..

C. *α-Benzylsulfonyl-γ-diethylamino-α-phenylbutyronitrile methobromide.*—An aqueous suspension of 25 parts of the hydrochloride of the preceding part B is made alkaline with aqueous potash. The mixture is extracted with ether; and the ether solution, washed well with water, is dried over anhydrous sodium sulfate and finally evaporated free of solvent. The residue is taken up in 160 parts of methyl ethyl ketone and this solution allowed to react with 70 parts of methyl bromide in 160 parts of methyl ethyl ketone at 60° C. in a closed system overnight. Anhydrous ether is then added, precipitating the desired quaternary salt which, upon washing with boiling methyl ethyl ketone, shows M. P. 169–170° C. The α-benzylsulfonyl-γ-diethylamino-α-phenylbutyronitrile methobromide thus prepared has the formula

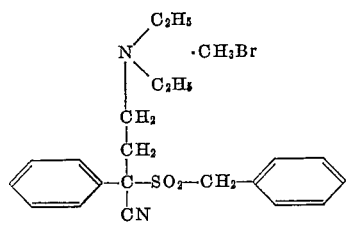

I claim:
1. A member of the group consisting of compounds of the formula

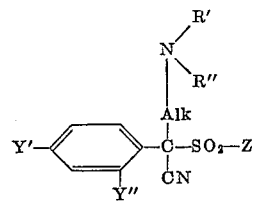

and non-toxic salts thereof, said compounds and their salts being such that in the specified formula, R' and R" are selected from the group consisting of hydrogen and lower alkyl radicals containing less than 6 carbon atoms; Alk is a lower alkylene radical containing less than 5 carbon atoms; Y' and Y" are selected from the group consisting of hydrogen, chlorine, and bromine; and Z is a hydrocarbon radical containing less than 8 carbon atoms.

2. A compound of the formula

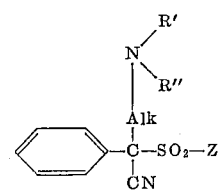

wherein R' and R" are lower alkyl radicals containing less than 6 carbon atoms, Alk is a lower alkylene radical containing less than 5 carbon atoms, and Z is a hydrocarbon radical containing less than 8 carbon atoms.

3. A compound of the formula

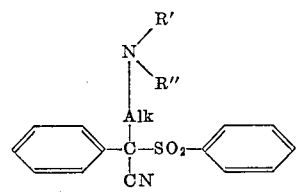

wherein R' and R" are lower alkyl radicals containing less than 6 carbon atoms and Alk is a lower alkylene radical containing less than 5 carbon atoms.

4. A compound of the formula

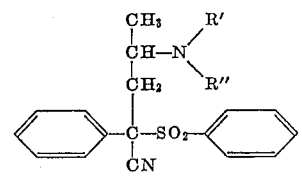

wherein R' and R" are lower alkyl radicals containing less than 6 carbon atoms.

5. γ-Dimethylamino-α-phenyl-α-phenylsulfonylvaleronitrile.

6. A non-toxic salt of a compound of the formula

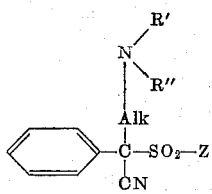

wherein R' and R'' are lower alkyl radicals containing less than 6 carbon atoms, Alk is a lower alkylene radical containing less than 5 carbon atoms, and Z is a hydrocarbon radical containing less than 8 carbon atoms.

7. A compound of the formula

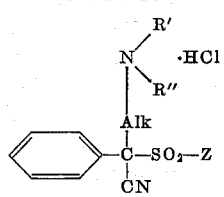

wherein R' and R'' are lower alkyl radicals containing less than 6 carbon atoms, Alk is a lower alkylene radical containing less than 5 carbon atoms, and Z is a hydrocarbon radical containing less than 8 carbon atoms.

8. A compound of the formula

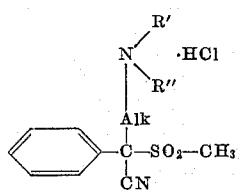

wherein R' and R'' are lower alkyl radicals containing less than 6 carbon atoms and Alk is a lower alkylene radical containing less than 5 carbon atoms.

9. A compound of the formula

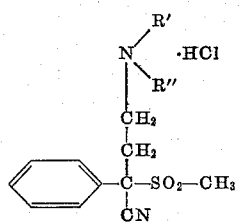

wherein R' and R'' are lower alkyl radicals containing less than 6 carbon atoms.

10. γ-Diethylamino-α-methylsulfonyl-α-phenyl-butyronitrile hydrochloride.

11. A compound of the formula

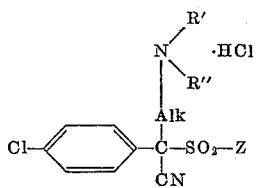

wherein R' and R'' are lower alkyl radicals containing less than 6 carbon atoms, Alk is a lower alkylene radical containing less than 5 carbon atoms, and Z is a hydrocarbon radical containing less than 8 carbon atoms.

12. A compound of the formula

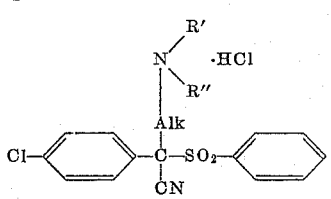

wherein R' and R'' are lower alkyl radicals containing less than 6 carbon atoms and Alk is a lower alkylene radical containing less than 5 carbon atoms.

13. A compound of the formula

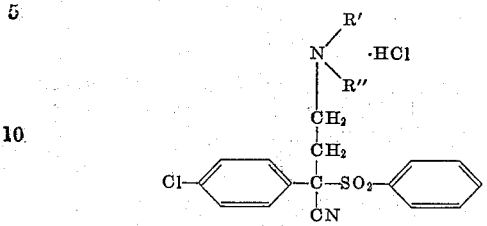

wherein R' and R'' are lower alkyl radicals containing less than 6 carbon atoms.

14. α-(p-Chlorophenyl)-γ-diethylamino-α-phenyl-sulfonylbutyronitrile hydrochloride.

15. In a process for manufacturing a member of the group consisting of compounds of the formula

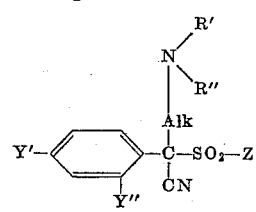

and non-toxic salts thereof, said compounds and their salts being such that in the specified formula, R' and R'' are selected from the group consisting of hydrogen and lower alkyl radicals containing less than 6 carbon atoms; Alk is a lower alkylene radical containing less than 5 carbon atoms; Y' and Y'' are selected from the group consisting of hydrogen, chlorine, and bromine; and Z is a hydrocarbon radical containing less than 8 carbon atoms; the step which comprises contacting a sulfone of the formula

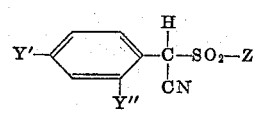

wherein Y', and Y'', and Z have the meanings assigned above, with an aminoalkyl halide in the presence of a base, said aminoalkyl halide having the formula

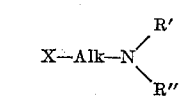

wherein X is selected from the group consisting of chlorine and bromine; and Alk, R', and R'', have the meanings assigned before.

16. In a process for manufacturing a member of the group consisting of compounds of the formula

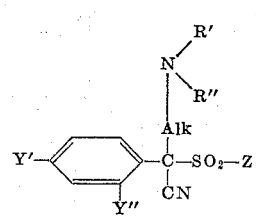

and non-toxic salts thereof, said compounds and their salts being such that in the specified formula, R' and R'' are selected from the group consisting of hydrogen and lower alkyl radicals containing less than 6 carbon atoms; Alk is a lower alkylene radical containing less than 5 carbon atoms; Y' and Y'' are selected from the group consisting of hydrogen, chlorine, and bromine; and Z is a hydrocarbon radical containing less than 8 carbon atoms; the step which comprises contacting, in a polar medium at temperatures ranging between 15° and 125° C., a sulfone of the formula

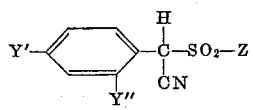

wherein Y', Y", and Z have the meanings assigned above, with an aminoalkyl halide in the presence of a base, said aminoalkyl halide having the formula

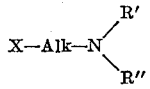

wherein X is selected from the group consisting of chlorine and bromine; and Alk, R', and R" have the meanings assigned before.

17. In a process for manufacturing a member of the group consisting of compounds of the formula

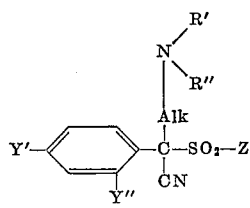

and non-toxic salts thereof, said compounds and their salts being such that in the specified formula, R' and R" are selected from the group consisting of hydrogen and lower alkyl radicals containing less than 6 carbon atoms; Alk is a lower alkylene radical containing less than 5 carbon atoms; Y' and Y" are selected from the group consisting of hydrogen, chlorine, and bromine; and Z is a hydrocarbon radical containing less than 8 carbon atoms, the step which comprises contacting in aqueous medium at room temperatures, a sulfone of the formula

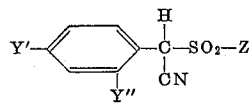

wherein Y', Y", and Z have the meanings assigned above, with an aminoalkyl halide in the presence of a base, said aminoalkyl halide having the formula

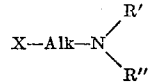

wherein X is selected from the group consisting of chlorine and bromine; and Alk, R', and R" have the meanings assigned before.

18. In a process for the manufacture of a member of the group consisting of compounds of the formula

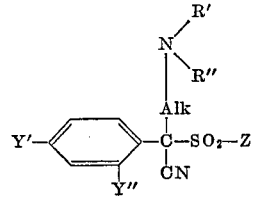

and non-toxic salts thereof, said compounds and their salts being such that in the specified formula, R' and R" are selected from the group consisting of hydrogen and lower alkyl radicals containing less than 6 carbon atoms; Alk is a lower alkylene radical containing less than 5 carbon atoms; Y' and Y" are selected from the group consisting of hydrogen, chlorine, and bromine; and Z is a hydrocarbon radical containing less than 8 carbon atoms, the step which comprises contacting, in aqueous solvent at room temperatures, a sulfone of the formula

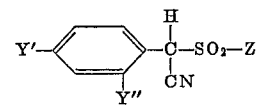

wherein Y', Y", and Z have the meanings assigned above, with potassium hydroxide and an aminoalkyl halide of the formula

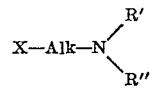

wherein X is selected from the group consisting of chlorine and bromine; and Alk, R', and R" have the meanings assigned before.

19. In a process for preparing a member of the group consisting of γ-dimethylamino-α-phenyl-α-phenylsulfonyl-valeronitrile, γ-dimethylamino-β-methyl-α-phenyl-α-phenylsulfonylbutyronitrile, and non-toxic salts of these compounds, the step which comprises contacting α-phenyl-α-phenylsulfonylacetonitrile at room temperatures in aqueous solvent with potassium hydroxide and β-dimethylaminoisopropyl chloride.

20. In a process for preparing a member of the group consisting of γ-diethylamino-α-methylsulfonyl-α-phenylbutyronitrile and non-toxic salts thereof, the step which comprises contacting α-methylsulfonyl-α-phenylacetonitrile at room temperatures in aqueous solvent with potassium hydroxide and β-diethylaminoethyl chloride.

21. In a process for preparing a member of the group consisting of α-(p-chlorophenyl)-γ-diethylamino-α-phenylsulfonylbutyronitrile and non-toxic salts thereof, the step which comprises contacting α-(p-chlorophenyl)-α-phenylsulfonylacetonitrile at room temperatures in aqueous solvent with potassium hydroxide and β-diethylaminoethyl chloride.

References Cited in the file of this patent

UNITED STATES PATENTS 2,540,636   Stoughton _____ Feb. 6, 1951

OTHER REFERENCES

Dodson et al.: Jour. Am. Chem. Soc., vol. 73, pgs. 4517–18 (1951).